United States Patent
Baradel et al.

(10) Patent No.: US 12,394,089 B2
(45) Date of Patent: Aug. 19, 2025

(54) POSE ESTIMATION SYSTEMS AND METHODS TRAINED USING MOTION CAPTURE DATA

(71) Applicant: NAVER CORPORATION, Gyeonggi-do (KR)

(72) Inventors: Fabien Baradel, Grenoble (FR);
Romain Bregier, Grenoble (FR);
Thibault Groueix, Grenoble (FR);
Ioannis Kalantidis, Grenoble (FR);
Philippe Weinzaepfel,
Montbonnot-Saint-Martin (FR);
Gregory Rogez, Gières (FR)

(73) Assignee: NAVER CORPORATION, Gyeonggi-Do (KR)

( * ) Notice: Subject to any disclaimer, the term of this patent is extended or adjusted under 35 U.S.C. 154(b) by 581 days.

(21) Appl. No.: 17/493,045

(22) Filed: Oct. 4, 2021

(65) Prior Publication Data
US 2023/0119559 A1    Apr. 20, 2023

(51) Int. Cl.
*G06T 7/73* (2017.01)
*G06F 18/214* (2023.01)
(Continued)

(52) U.S. Cl.
CPC .............. *G06T 7/75* (2017.01); *G06F 18/214* (2023.01); *G06N 3/08* (2013.01); *G06T 7/251* (2017.01);
(Continued)

(58) Field of Classification Search
CPC ........ G06T 7/75; G06T 7/251; G06T 2200/08; G06T 2207/20081; G06T 2207/20084;
(Continued)

(56) References Cited

U.S. PATENT DOCUMENTS 10,679,046 B1 *   6/2020   Black .................... G06V 40/23
2021/0200190 A1 * 7/2021   Guo ....................... G06N 3/045
(Continued)

OTHER PUBLICATIONS

L. Müller, A. A. A. Osman, S. Tang, C.-H. P. Huang and M. J. Black, "On Self-Contact and Human Pose," 2021 IEEE/CVF Conference on Computer Vision and Pattern Recognition (CVPR), Nashville, TN, USA, Jun. 1, 2021, pp. 9985-9994, doi: 10.1109/CVPR46437.2021.00986. (Year: 2021).*

(Continued)

*Primary Examiner* — Nay A Maung
*Assistant Examiner* — Dustin Bilodeau

(57) ABSTRACT

A training system includes: a neural network model configured to determine three-dimensional coordinates of joints, respectively, representing poses of animals in images, where the neural network model is trained using a first training dataset including: images including animals; and coordinates of joints of the animals in the images, respectively; and a training module configured to, after the training of the neural network model using the first training dataset, train the neural network model using a second training dataset including motion capture data, where the motion capture data does not include images of animals and includes measured coordinates at points, respectively, on animals.

20 Claims, 11 Drawing Sheets
(4 of 11 Drawing Sheet(s) Filed in Color)

(51) Int. Cl.
    *G06N 3/08* (2023.01)
    *G06T 7/246* (2017.01)
    *G06V 40/10* (2022.01)
(52) U.S. Cl.
    CPC ............... *G06T 2200/08* (2013.01); *G06T 2207/20081* (2013.01); *G06T 2207/20084* (2013.01)
(58) Field of Classification Search
    CPC . G06T 2207/10016; G06T 2207/30196; G06T 7/73; G06F 18/214; G06N 3/08; G06N 3/048; G06N 3/0464; G06V 40/10; G06V 10/82
    See application file for complete search history.

(56) References Cited

U.S. PATENT DOCUMENTS

| | | | | |
|---|---|---|---|---|
| 2021/0326601 | A1* | 10/2021 | Tang | G06T 7/74 |
| 2022/0101113 | A1* | 3/2022 | Tam | G06N 3/045 |
| 2023/0048497 | A1* | 2/2023 | Choi | G06V 20/70 |
| 2023/0067081 | A1* | 3/2023 | Serackis | G06N 3/044 |

OTHER PUBLICATIONS

Adrien Gaidon, Antonio M. Lopez, and Florent Perronnin. The reasonable effectiveness of synthetic visual data. IJCV, 2018.
Angjoo Kanazawa, Jason Y Zhang, Panna Felsen, and Jitendra Malik. Learning 3D human dynamics from video. In CVPR, 2019.
Angjoo Kanazawa, Michael J Black, David W Jacobs, and Jitendra Malik. End-to-end recovery of human shape and pose. In CVPR, 2018.
Anurag Arnab, Carl Doersch, and Andrew Zisserman. Exploiting temporal context for 3D human pose estimation in the wild. In CVPR, 2019.
Ashish Vaswani, Noam Shazeer, Niki Parmar, Jakob Uszkoreit, Llion Jones, Aidan N Gomez, Lukasz Kaiser, and Illia Polosukhin. In NeurIPS, 2017.
Carl Doersch and Andrew Zisserman. Sim2real transfer learning for 3D human pose estimation: motion to the rescue. In NeurIPS, 2019.
Catalin Ionescu, Dragos Papava, Vlad Olaru, and Cristian Sminchisescu. Human3.6M: Large scale datasets and predictive methods for 3D human sensing in natural environments. IEEE Trans. PAMI, 2014.
Christoph Lassner, Javier Romero, Martin Kiefel, Federica Bogo, Michael J Black, and Peter V Gehler. Unite the people: Closing the loop between 3D and 2D human representations. In CVPR, 2017.
Dushyant Mehta, Helge Rhodin, Dan Casas, Pascal Fua, Oleksandr Sotnychenko, Weipeng Xu, and Christian Theobalt. Monocular 3d human pose estimation in the wild using improved cnn supervision. In 3DV, 2017.
Dushyant Mehta, Oleksandr Sotnychenko, Franziska Mueller, Weipeng Xu, Srinath Sridhar, Gerard Pons-Moll, and Christian Theobalt. Single-shot multi-person 3d pose estimation from monocular rgb. In 3DV, 2018.
Federica Bogo, Angjoo Kanazawa, Christoph Lassner, Peter V. Gehler, Javier Romero, and Michael J. Black. Keep it SMPL: automatic estimation of 3D human pose and shape from a single image. In ECCV, 2016.
Fisher Yu, Yinda Zhang, Shuran Song, Ari Seff, and Jianxiong Xiao. LSUN: Construction of a large-scale image dataset using deep learning with humans in the loop. arXiv preprint arXiv:1506.03365, 2015.
Georgios Pavlakos, Jitendra Malik, and Angjoo Kanazawa. Human mesh recovery from multiple shots. arXiv preprint arXiv:2012.09843, 2020.
Georgios Pavlakos, Nikos Kolotouros, and Kostas Daniilidis. Texturepose: Supervising human mesh estimation with texture consistency. In ICCV, 2019.
Gregory Rogez and Cordelia Schmid. Mocap-guided data augmentation for 3D pose estimation in the wild. In NIPS, 2016.
Gul Varol, Duygu Ceylan, Bryan Russell, Jimei Yang, Ersin Yumer, Ivan Laptev, and Cordelia Schmid. Bodynet: Volumetric inference of 3d human body shapes. In ECCV, 2018.
Gul Varol, Javier Romero, Xavier Martin, Naureen Mahmood, Michael J. Black, Ivan Laptev, and Cordelia Schmid. Learning from synthetic humans. In CVPR, 2017.
Gyeongsik Moon and Kyoung Mu Lee. I2l-meshnet: Imageto-lixel prediction network for accurate 3D human pose and mesh estimation from a single rgb image. arXiv preprint arXiv:2008.03713, 2020.
Hongsuk Choi, Gyeongsik Moon, and Kyoung Mu Lee. Beyond static features for temporally consistent 3D human pose and shape from a video. arXiv preprint arXiv:2011.08627, 2020.
Hongsuk Choi, Gyeongsik Moon, and Kyoung Mu Lee. Pose2mesh: Graph convolutional network for 3D human pose and mesh recovery from a 2d human pose. In ECCV, 2020.
Jacob Devlin, Ming-Wei Chang, Kenton Lee, and Kristina Toutanova. Bert: Pre-training of deep bidirectional transformers for language understanding. arXiv preprint arXiv:1810.04805, 2018.
Jogendra Nath Kundu, Ambareesh Revanur, Govind Vitthal Waghmare, Rahul Mysore Venkatesh, and R Venkatesh Babu. Unsupervised cross-modal alignment for multi-person 3d pose estimation. In ECCV, 2020.
Jonathan Frankle, David J Schwab, and Ari S Morcos. Training batchnorm and only batchnorm: On the expressive power of random features in cnns. In ICLR, 2021.
Matthew Loper, Naureen Mahmood, Javier Romero, Gerard Pons-Moll, and Michael J. Black. SMPL: a skinned multiperson linear model. ACM Transactions on Graphics, 2015.
Mohamed Omran, Christoph Lassner, Gerard Pons-Moll, Peter Gehler, and Bernt Schiele. Neural body fitting: Unifying deep learning and model based human pose and shape estimation. In 3DV, 2018.
Muhammed Kocabas, Nikos Athanasiou, and Michael J Black. Vibe: Video inference for human body pose and shape estimation. In CVPR, 2020.
Mykhaylo Andriluka, Leonid Pishchulin, Peter Gehler, and Bernt Schiele. 2D human pose estimation: New benchmark and state of the art analysis. In CVPR, 2014.
Naureen Mahmood, Nima Ghorbani, Nikolaus F. Troje, Gerard Pons-Moll, and Michael Black. AMASS: Archive of Motion Capture as Surface Shapes. In ICCV, 2019.
Nikos Kolotouros, Georgios Pavlakos, and Kostas Daniilidis. Convolutional mesh regression for single-image human shape reconstruction. In CVPR, 2019.
Nikos Kolotouros, Georgios Pavlakos, Michael J Black, and Kostas Daniilidis. Learning to reconstruct 3D human pose and shape via model-fitting in the loop. In ICCV, 2019.
Sam Johnson and Mark Everingham. Clustered pose and nonlinear appearance models for human pose estimation. In BMVC, 2010.
Sergey Ioffe and Christian Szegedy. Batch normalization: Accelerating deep network training by reducing internal covariate shift. In ICML, 2015.
Shuhei Tsuchida, Satoru Fukayama, Masahiro Hamasaki, and Masataka Goto. Aist dance video database: Multi-genre, multi-dancer, and multi-camera database for dance information processing. In ISMIR, 2019.
Timo von Marcard, Roberto Henschel, Michael J. Black, Bodo Rosenhahn, and Gerard Pons-Moll. Recovering Accurate 3D Human Pose in the Wild Using IMUs and a Moving Camera. In ECCV, 2018.
Tsung-Yi Lin, Michael Maire, Serge Belongie, James Hays, Pietro Perona, Deva Ramanan, Piotr Dollar, and C Lawrence Zitnick. Microsoft coco: Common objects in context. In ECCV, 2014.
Tyler Zhu, Per Karlsson, and Christoph Bregler. Simpose: Effectively learning densepose and surface normals of people from simulated data. In ECCV, 2020.
Vincent Leroy, Philippe Weinzaepfel, Romain Bregier, Hadrien Combaluzier, and Gregory Rogez. SMPLy bench-marking 3D human pose estimation in the wild. In 3DV, 2020.

(56) References Cited

OTHER PUBLICATIONS

Wenzheng Chen, Huan Wang, Yangyan Li, Hao Su, Zhenhua Wang, Changhe Tu, Dani Lischinski, Daniel Cohen-Or, and Baoquan Chen. Synthesizing training images for boosting human 3D pose estimation. In 3DV, 2016.

Yi Zhou, Connelly Barnes, Jingwan Lu, Jimei Yang, and Hao Li. On the continuity of rotation representations in neural networks. In CVPR, 2019.

Yinghao Huang, Federica Bogo, Christoph Lassner, Angjoo Kanazawa, Peter V. Gehler, Ijaz Akhter, and Michael J. Black. Towards accurate markerless human shape and pose estimation over time. In 3DV, 2017.

Yu Rong, Ziwei Liu, Cheng Li, Kaidi Cao, and Chen Change Loy. Delving deep into hybrid annotations for 3D human recovery in the wild. In ICCV, 2019.

Yu Sun, Yun Ye, Wu Liu, Wenpeng Gao, Yili Fu, and Tao Mei. Human mesh recovery from monocular images via a skeleton-disentangled representation. In ICCV, 2019.

Zhengyi Luo, S Alireza Golestaneh, and Kris M Kitani. 3d human motion estimation via motion compression and refinement. In ACCV, 2020.

\* cited by examiner

POSE ESTIMATION SYSTEMS AND METHODS TRAINED USING MOTION CAPTURE DATA

FIELD

The present disclosure relates to human pose estimation systems and methods and more particularly to human pose estimation systems and methods trained using motion capture data.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Neural network models could be trained to determine three dimensional (3D) pose and shape of humans in images or video using large datasets of images with annotated 3D poses and shapes. Such datasets, however, are not readily available and tend to be very costly to collect. For example, the collection of such data may involve setting up multiple inertial measurement units (IMUs), calibrating a multi camera system, and considering static poses. In practice, only two-dimensional (2D) information such as 2D keypoint locations or semantic part segmentation may be manually annotated.

There is therefore a need to be able to train models to accurately determine 3D pose and shape of humans using images and video without a large dataset of annotated 3D poses and shapes.

SUMMARY

In a feature, a training system includes: a neural network model configured to determine three-dimensional coordinates of joints, respectively, representing poses of animals in images, where the neural network model is trained using a first training dataset including: images including animals; and coordinates of joints of the animals in the images, respectively; and a training module configured to, after the training of the neural network model using the first training dataset, train the neural network model using a second training dataset including motion capture data, where the motion capture data does not include images of animals and includes measured coordinates at points, respectively, on animals.

In further features: the neural network model includes batch normalization layers; and the training module is configured to, after the training of the neural network model using the first training dataset, train the neural network model by selectively adjusting at least one parameter of at least one of the batch normalization layers.

In further features, the training module is configured to selectively adjust only parameters of the batch normalization layers and maintain all other parameters of all other portions of the neural network model constant after the training of the neural network model using the first training dataset.

In further features, the training module is configured to, after the training of the neural network model using the first training dataset, train the neural network model further using data from the first training dataset.

In further features, the training module is configured to: render models of animals based on the motion capture data; texturize the models using textures from a texture dataset; apply backgrounds to the models from a background dataset; and train the neural network model using the texturized models with the backgrounds.

In further features, the training module is further configured to selectively: render second models of the animals in the images using the coordinates of the joints of the animals, respectively; texturize the second models using textures from the texture dataset; apply second backgrounds to the models from the background dataset; and train the neural network model using the texturized second models with the second backgrounds.

In further features, the model is the SPIN model.

In further features, the motion capture data in the second training dataset includes motion capture data from the AMASS dataset.

In a feature, a system includes: a neural network model configured to determine three-dimensional coordinates of joints, respectively, representing a pose of an animal in an image, where the neural network model is trained using: a first training dataset including: images including animals; and coordinates of joints of the animals in the images, respectively; and a second training dataset including motion capture data that: does not include images of animals; and includes measured coordinates at points, respectively, on animals; and a camera configured to capture images; and a control module configured to selectively actuate an actuator based on three-dimensional coordinates of joints representing a pose of an animal determined by the neural network model based on an image captured by the camera.

In a feature, a training system includes: a neural network model configured to determine three-dimensional coordinates of joints, respectively, representing poses of animals in sequences of images, where T is an integer greater than one; and a training module configured to train the neural network model using a training dataset including sets of time series of motion capture data, where the motion capture data does not include images of animals and includes measured coordinates at points, respectively, on animals.

In further features, the training module is configured to: render a time series of models of animals based on one of the sets of time series of motion capture data; and train the neural network model based on outputs of the neural network model generated in response to the time series of models.

In further features, a masking module is configured to replace at least one of the models in the time series of models with a predetermined masking token.

In further features, the masking module is configured to replace a predetermined percentage of the models in the time series of models with a predetermined masking token.

In further features, the predetermined percentage is approximately 12.5 percent.

In further features, a masking module is configured to replace at least one of the models in the time series of models with a different model.

In further features, the masking module is configured to replace a predetermined percentage of the models in the time series of models with different models.

In further features, a noise module is configured to add noise to at least one of the models in the time series of models.

In further features, the noise includes Gaussian noise.

In further features, a position encoding module is configured to add positional encodings to the time series of models.

In further features, the training module is configured to train the neural network model based on minimizing a pose loss determined based on differences between: three-dimensional coordinates determined by the neural network model based on the time series of models of animals; and coordinates of the motion capture data stored in the training dataset.

In further features, the training module is configured to train the neural network model based on minimizing a three-dimensional keypoint loss determined based on differences between: three-dimensional coordinates determined by the neural network model based on the time series of models of animals; and coordinates of the motion capture data stored in the training dataset.

In a feature, a system includes: a neural network model configured to determine three-dimensional coordinates of joints, respectively, representing poses of animals, where the neural network model is trained using a training dataset including motion capture data that: does not include images of animals; and includes measured coordinates at points, respectively, on animals; and a camera configured to capture time series of images; and a control module configured to selectively actuate an actuator based on three-dimensional coordinates of joints representing a pose of an animal determined by the neural network model based on a time series of images captured by the camera.

In a feature, a training method includes: training, using a first training dataset, a neural network model to determine three-dimensional coordinates of joints, respectively, representing poses of animals in images, the first training dataset including: images including animals; and coordinates of joints of the animals in the images, respectively; and after the training of the neural network model using the first training dataset, training the neural network model using a second training dataset including motion capture data, where the motion capture data does not include images of animals and includes measured coordinates at points, respectively, on animals.

In a feature, a method includes: using a neural network model, determining three-dimensional coordinates of joints, respectively, representing a pose of an animal in an image, where the neural network model is trained using: a first training dataset including: images including animals; and coordinates of joints of the animals in the images, respectively; and a second training dataset including motion capture data that: does not include images of animals; and includes measured coordinates at points, respectively, on animals; capturing images using a camera; and selectively actuating an actuator based on three-dimensional coordinates of joints representing a pose of an animal determined by the neural network model based on an image captured by the camera.

In a feature, a training method includes: using a neural network model, determining three-dimensional coordinates of joints, respectively, representing poses of animals in sequences of images, where T is an integer greater than one; and training the neural network model using a training dataset including sets of time series of motion capture data, where the motion capture data does not include images of animals and includes measured coordinates at points, respectively, on animals.

In a feature, a training method includes: training a neural network model to determine three-dimensional coordinates of joints, respectively, representing poses of animals using a training dataset including motion capture data that: does not include images of animals; and includes measured coordinates at points, respectively, on animals; capturing time series of images using a camera; and selectively actuating an actuator based on three-dimensional coordinates of joints representing a pose of an animal determined by the neural network model based on a time series of images captured by the camera.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure will become more fully understood from the detailed description and the accompanying drawings, wherein.

In the drawings, reference numbers may be reused to identify similar and/or identical elements.

DETAILED DESCRIPTION

Robots can be trained to perform tasks in various different ways. For example, a robot can be trained using positions of joints of humans in images or video captured while performing tasks.

The present disclosure involves training a neural network model to determine three dimensional (3D) poses and shapes of humans in images and video using motion capture (MoCap) data. The motion capture data includes motion sequences of humans and measured ground truth 3D poses. The present disclosure also involves a pose estimator that receives the output of a bidirectional encoder representations from transformers (BERT) model and directly regresses 3D pose. While the example of use in a robot is provided and will be described, the present disclosure is also applicable to other uses of estimated 3D poses generated based on input images or video, such as for avatar animation, video and image indexing, virtual try on of clothing, body language detection, and other places.

Figure 1:
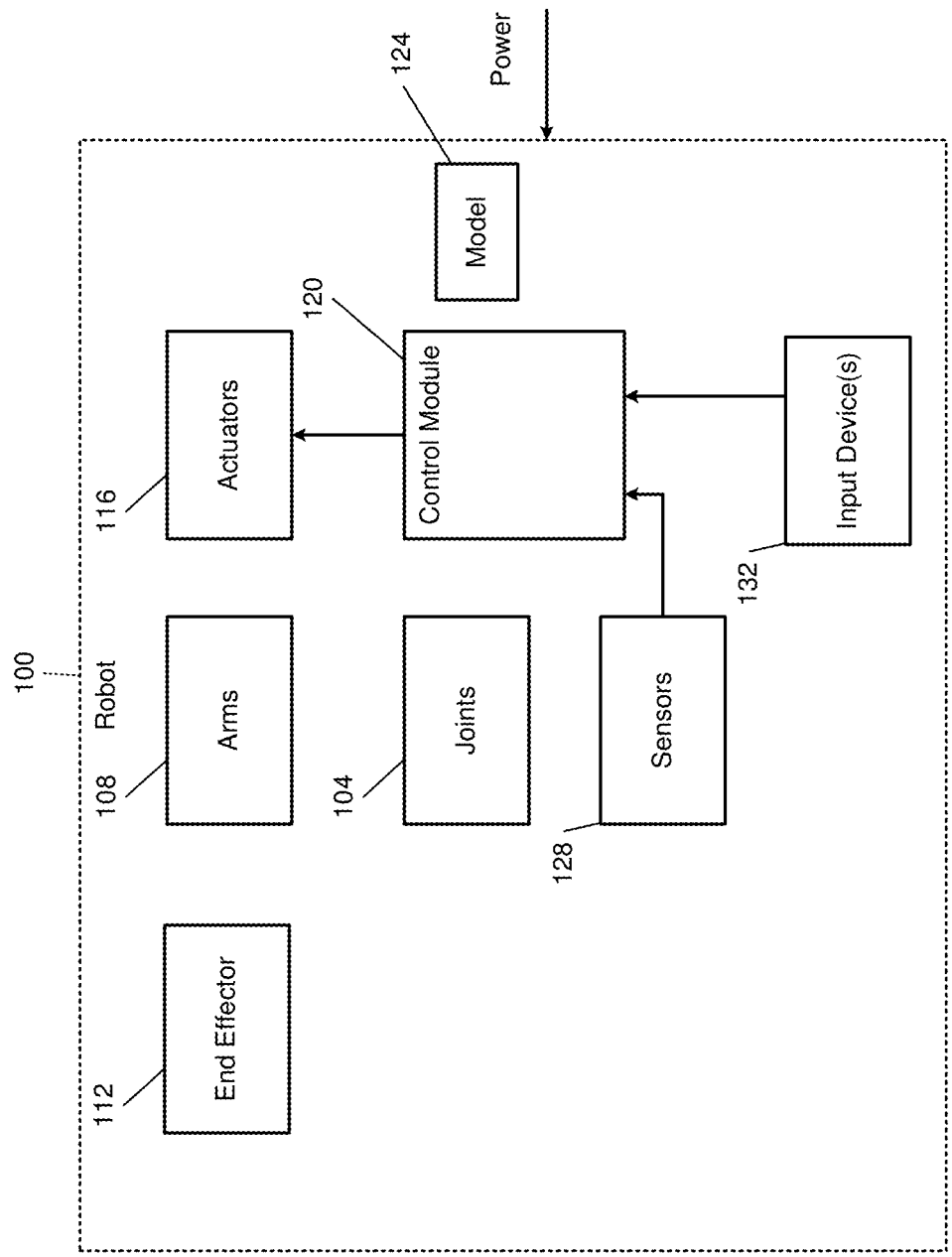
FIG. 1 is a functional block diagram of an example robot.

FIG. 1 is a functional block diagram of an example robot 100. The robot 100 may be stationary or mobile. The robot may be, for example, a 5 degree of freedom (DoF) robot, a 6 DoF robot, a 7 DoF robot, an 8 DoF robot, or have another amount of degrees of freedom. In various implementations, the robot 100 may be an autonomous vehicle.

The robot 100 is powered, such as via an internal battery and/or via an external power source, such as alternating current (AC) power. AC power may be received via an outlet, a direct connection, etc. In various implementations, the robot 100 may receive power wirelessly, such as inductively.

The robot 100 may include a plurality of joints 104 and arms 108. Each arm may be connected between two joints. Each joint may introduce a degree of freedom of movement of an end effector 112 of the robot 100. The end effector 112 may be, for example, a gripper, a cutter, a roller, or another suitable type of end effector. The robot 100 includes actuators 116 that actuate the arms 108 and the end effector 112. The actuators 116 may include, for example, electric motors and other types of linear and rotational actuation devices. In vehicles, the actuators 116 may control movement of the vehicle.

A control module 120 controls the actuators 116 and therefore the actuation of the robot 100 using a model 124 that is a neural network model. The control module 120 may, for example, control the application of power to the actuators 116 to control actuation. The model 124 is trained using motion capture data as described below.

The control module 120 may control actuation based on measurements from one or more sensors 128, such as using feedback and/or feedforward control. Examples of sensors include red green blue (RGB) cameras, position sensors, force sensors, torque sensors, etc. For example, the control module 120 may determine a 3D pose and a shape of a human captured in an image or video from an RGB camera and control actuation based on at least one of the 3D pose and shape of the human. The control module 120 may control actuation additionally or alternatively based on input from one or more input devices 132, such as one or more touchscreen displays, joysticks, trackballs, pointer devices (e.g., mouse), keyboards, and/or one or more other suitable types of input devices. In vehicles, examples of input devices include a steering wheel, an accelerator pedal, a brake pedal, etc. The control module 120 may control actuation, for example, to avoid colliding with humans in images captured. While the example of humans is discussed herein, the present disclosure is also applicable to other types of animals with joints, such as dogs, cats, etc.

Figure 2:
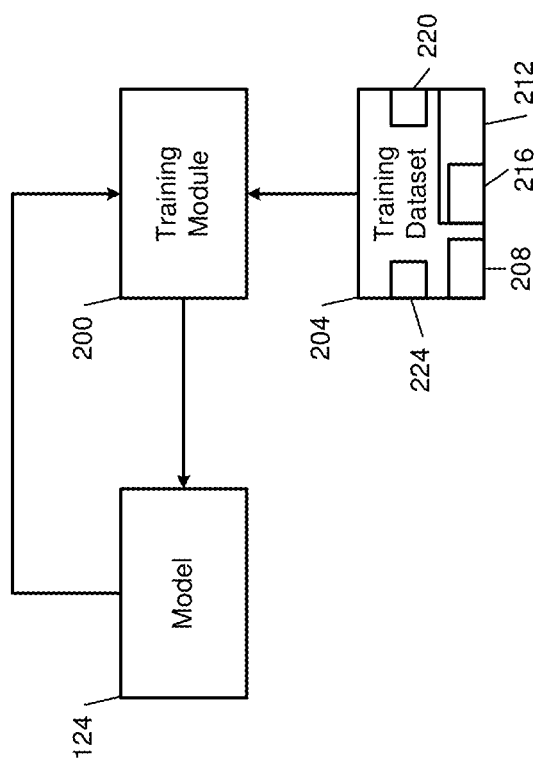
FIG. 2 is a functional block diagram of an example implementation of a training system.

FIG. 2 is a functional block diagram of an example implementation of a training system. A training module 200 trains the model 124 using a training dataset 204. The training dataset 204 includes motion capture data 208. The motion capture data 208 includes sequences of measured (ground truth) 3D coordinates of human body parts and do not include any images. The training dataset 204 may also include real image data 212, such as images with humans and annotations including 3D pose and shape of the humans in the images. Examples of the real image data 212 include 2D pose estimation datasets like the COCO dataset, the LSP dataset, the LSPE dataset, and the MPII dataset, and/or 3D pose estimation datasets, such as the MPI-INF-3DHP dataset.

The model 124 may include a SPIN model (having a SPIN architecture) as described in Nikos Kolotourous, et al., titled "*Learning to Reconstruct 3D Human Pose and Shape Via Model-Fitting In The Loop*", ICCV, 2019, also published on arXiv as 1909.12828, on Sep. 27, 2019, which is incorporated herein in its entirety. While the example of the SPIN model will be described, the model 124 may be another suitable type of neural network model. The model 124 is trained to determine a pose of a human in an image (i.e., the localization of human joints in an image). The pose includes 3D positions (x, y, and z) of each joint (or keypoint, e.g., elbows, knees, wrists, etc.) of the human visible in the image. Humans may have, for example, 22 joints (or another suitable number of joints) that can be estimated. In some images, however, one or more joints may not be visible and may therefore not be estimated by the model 124.

Figure 3:
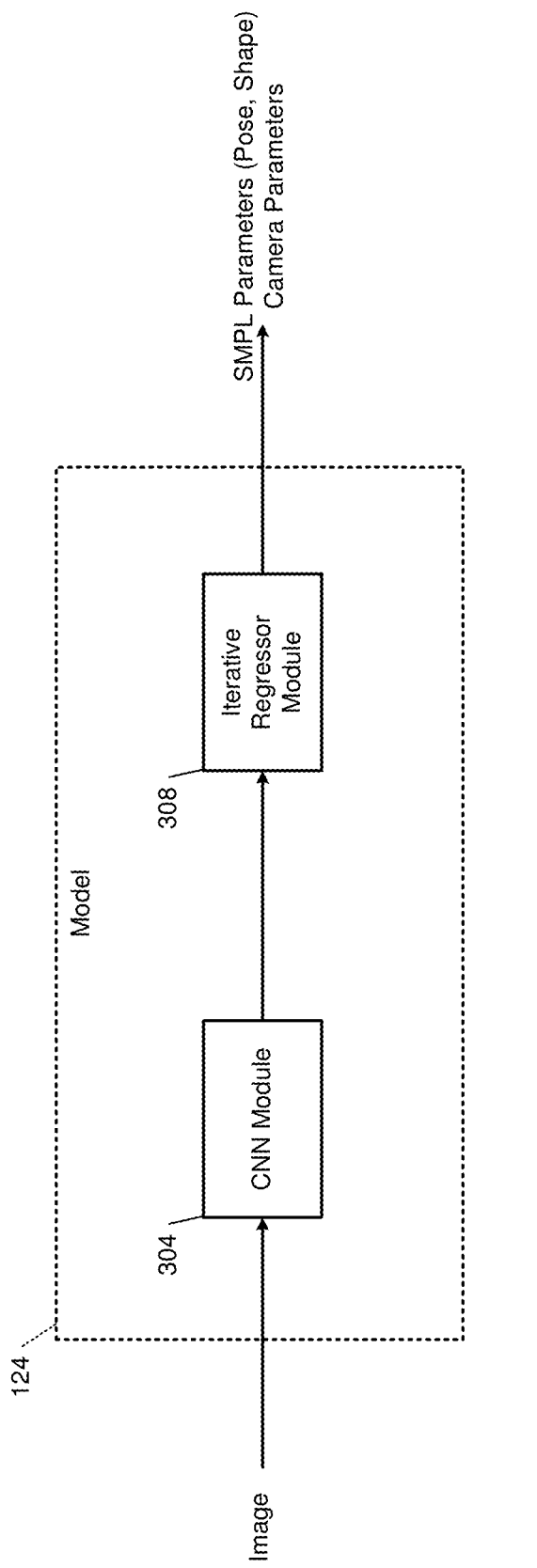
FIG. 3 is a functional block diagram of an example implementation of a model.

FIG. 3 is a functional block diagram of an example implementation of the model 124. The model 124 may include a convolutional neural network (CNN) module 304 that receives images. An iterative regressor module 308 iteratively regresses a 3D pose and a shape of a human in the image based on output from the CNN module 304. The iterative regressor module 308 may also regress one or more parameters (e.g., pose) of the camera used to capture the image. The parameters regressed by the iterative regressor module 308 may be referred to as SMPL parameters, which are discussed in more detail in Matthew Koper, et al., *SMPL: A Skinned Multi-Person Linear Model*, ACM Transactions On Graphics, 2015, which is incorporated herein in its entirety.

Figure 4:
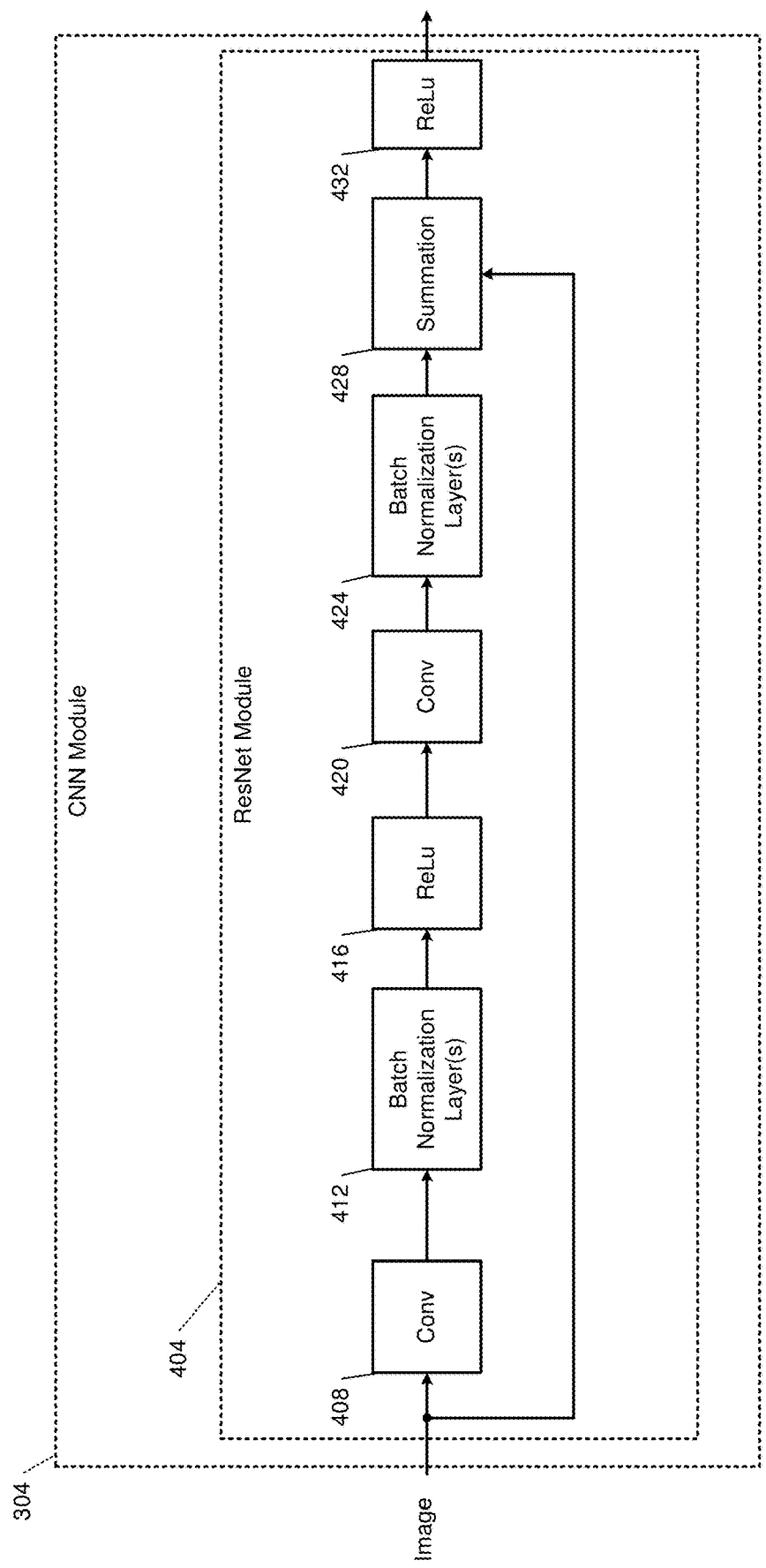
FIG. 4 is a functional block diagram of an example implementation of a convolutional neural network module.

FIG. 4 is a functional block diagram of an example implementation of the CNN module 304. The CNN module 304 includes L residual neural network (ResNet) modules 404 connected in series. L is an integer greater than or equal to one. Each ResNet module 404 includes a convolutional layer (module) 408. The convolutional layer 408 of the first ResNet module receives an image as input. The convolutional layers of following ResNet modules receive the output of the preceding ResNet module.

Each ResNet module includes one or more batch normalization (norm) layers (modules) 412 that receive output from the convolutional layer 408. A rectification linear unit (ReLu) module 416 receives output from the batch normalization layer(s) 412. A convolutional layer (module) 420 receives output from the batch normalization layer(s) 412. One or more batch normalization (norm) layers (modules) 424 receive output from the convolutional layer 420. A summation module 428 sums (adds) the input to the convolutional layer 408 with the output of the batch normalization layer(s) 424. A rectification linear unit (ReLu) module 432 receives output from the summation module 428.

Before fine tuning (training) the model 124 with the motion capture data 208, the training module 200 first trains the model 124 using pre-training data 216 (e.g., shown in FIG. 2) that includes RGB (red green blue) images and annotated 2D and/or 3D poses. The fine tuning performed using the motion capture data 208 exposes the model to a more diverse set of poses, viewpoints, textures, and backgrounds and therefore results in the model 124 being more accurate when faced with real world images.

The SPIN model, discussed above which in an embodiment may be included in the model 124, can be explained as follows and includes a deep convolutional neural network encoder f that performs feature extraction from cropped images and an iterative regressor r. Let $x \in R^d$ in a cropped image input to the model, $\phi_x = f(x)$ be the extracted feature(s), and $r(\phi_x) = \{\Theta_x, \Pi_x\}$ be the regressed prediction for the $d_\theta$ dimensional body model parameters $\Theta_x$ and $d_\pi$ dimensional camera parameters $\Pi_x$. The regressor r is initialized with mean pose parameters $\Theta_{mean}$ and is run for a number N of iterations. 6 dimensional (6D) representations (3D position and 3D orientation) may be used for 3D joint positions.

The training module 200 trains the one or more of the batch normalization layers of the CNN module 304 based on the motion capture data 208. The training module 200 may fine tune (train) parameters of the batch normalization layer(s), for example, based on minimizing at least one of a shape loss, a 3D keypoint loss, and a re-projection loss. Known reference data is stored for each piece of training data. The output of the model 124 generated based on an image is compared to the known reference data for the image to determine the loss(es).

After the pre-training using the pre-training data 216, the training module 200 samples (e.g., randomly) from the motion capture data 208 and the real image data 212 to further train the model 124. In various implementations the motion capture data 208 used to train the model 124 may be or include the AMASS (Archive of Motion Capture as Surface Shapes) dataset. The AMASS dataset is described in Naureen Mahmood, et al., *AMASS: Archive of Motion Capture As Surface Shapes*, ICCV, 2019.

Figure 5:
FIG. 5 includes examples of synthesized (synthetic) samples.
Figure 5:
Figure 5:

The training module 200 synthesizes some of the selected samples, such as by at least one of changing a viewpoint, changing a background, and changing texturing of a human in the sample. FIG. 5 includes examples of synthesized (synthetic) samples. For example, the top row in FIG. 5 includes one example sample of a human body from a sample of the motion capture data 208 illustrated in the left most image in the top row. The images to the right in the top row of FIG. 5 are different synthetic images produced from the left most image, such as by changing a viewpoint, changing a background, or changing texturing of the human.

The bottom row of FIG. 5 includes pairs of images. Each pair of images includes a real image (on left) from the real image data 212 and a synthetic image (on right) generated based on the real image by the training module 200. The training module 200 may, for example as shown in pairs of images in the bottom row of FIG. 5, change a background or a texture of a human in the real image (on left) to generate a synthetic image (on right). The training module 200 trains (fine tunes) the model 124 using synthetic images generated based on the motion capture data 208 (e.g., top row of FIG. 5), real images from the real image data 212, and synthetic images generated based on the real image data 212 (e.g., bottom row of FIG. 5).

Fine tuning the model 124 using only synthetic data (after the pre-training) may decrease performance of the model 124 due to the synthetic/real data domain shift. The training module 200 therefore fine tunes the model 124 using batches that include both real images from the real image data 212 from the pre-training and synthetic images generated from samples of the motion capture data 208. The weights of the model 124 may be initialized to predetermined values and direct supervision may be used: for synthetic images, the corresponding ground-truth parameters from the motion capture data 208 may be used; and for real images, the parameters output from the model 124 for the real images after the pre-training may be used.

Regarding rendering synthetic humans/images, to generate a human in a given pose, the training module 200 renders the SMPL model with a texture selected (e.g., randomly or in a predetermined order) from a texture dataset 220, and with a background image selected (e.g., randomly or in a predetermined order) from a background image dataset 224. Examples of synthetic renderings are illustrated in the top row of FIG. 5 with the left most image of the top row being a SMPL model generated based on a sample of the motion capture data 208.

Camera 3D orientation may be sampled considering a Tait-Bryan parameterization (e.g., +/−180 degrees yaw, +/−45 degrees pitch, +/−15 degrees roll, with yaw and roll axes horizontal when considering the identity rotation). This may model typical variability observed in the real data. The synthetic images/samples and the real images may be cropped by the training module 200 around the human in the image based on the location of 2D joints of the model. The fact that the entire human may not always be visible in the real images may be accounted for by cropping only upper body keypoints at the knees or hips in a predetermined portion (e.g., 20%) of the samples used. Examples of such croppings are illustrated in the top row of FIG. 5. The synthetic renderings from the real image data 212 may be generated by the training module 200 in the same way. Example pairs of real images and synthetic images generated from the real images are presented in the bottom row of FIG. 5.

Figure 6:
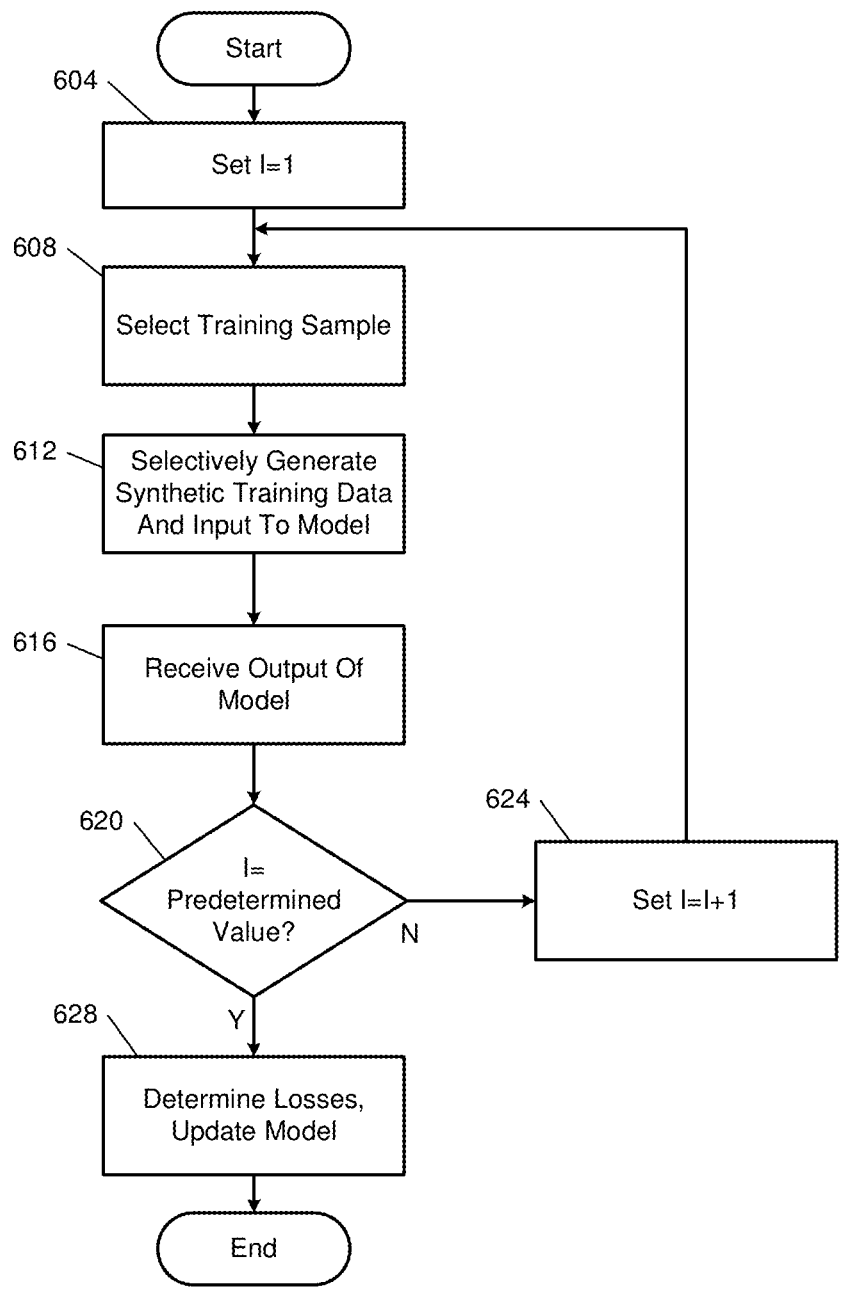
FIG. 6 is a flowchart depicting an example method of training the model.

FIG. 6 is a flowchart depicting an example method of training the model 124. Control begins with 604 where the training module 200 sets a counter value (I) equal to 1. At 608, the training module 200 selects a sample from the training dataset 204, such as from the motion capture data 208 or the real image data 212. At 612, the training module 200 selectively synthesizes the selected sample.

Some selected samples may be made synthetic before being input to the model 124, and some samples from the real image data 212 may be input to the model 124 without being synthesized. The training module 200 may, for example, synthesize a sample by selecting a texture from the texture dataset 220 and/or selecting a background from the background image dataset 224 and applying the selections to the selected sample. The training module 200 may also crop the sample as described above. The training module 200 inputs the sample to the model 124.

At 616, the training module 200 receives the output of the model 124 generated based on the input. At 620, the training module 200 determines whether the counter value I is equal to a predetermined number, such as 1,000 or another suitable number. If 620 is false, the training module 200 increments the counter value I by 1 at 624 (set I=I+1) and control returns to 608. If 620 is true, the training module 200 determines the losses (e.g., SMPL shape loss, 3D keypoint loss, 2D keypoint re-projection loss) based on the outputs of the model 124 and the associated annotations in the training dataset 204. The training module 200 fine tunes the model 124 based on minimizing the losses at 628. More specifically, the training module 200 fine tunes (adjusts) parameters of the batch normalization layer(s) of the model 124.

While the example of FIG. 6 is illustrated as ending, the example of FIG. 6 may be performed multiple times, such as a predetermined number of times or until one or more predetermined conditions occur (e.g., the losses are less than predetermined values).

Figure 7:
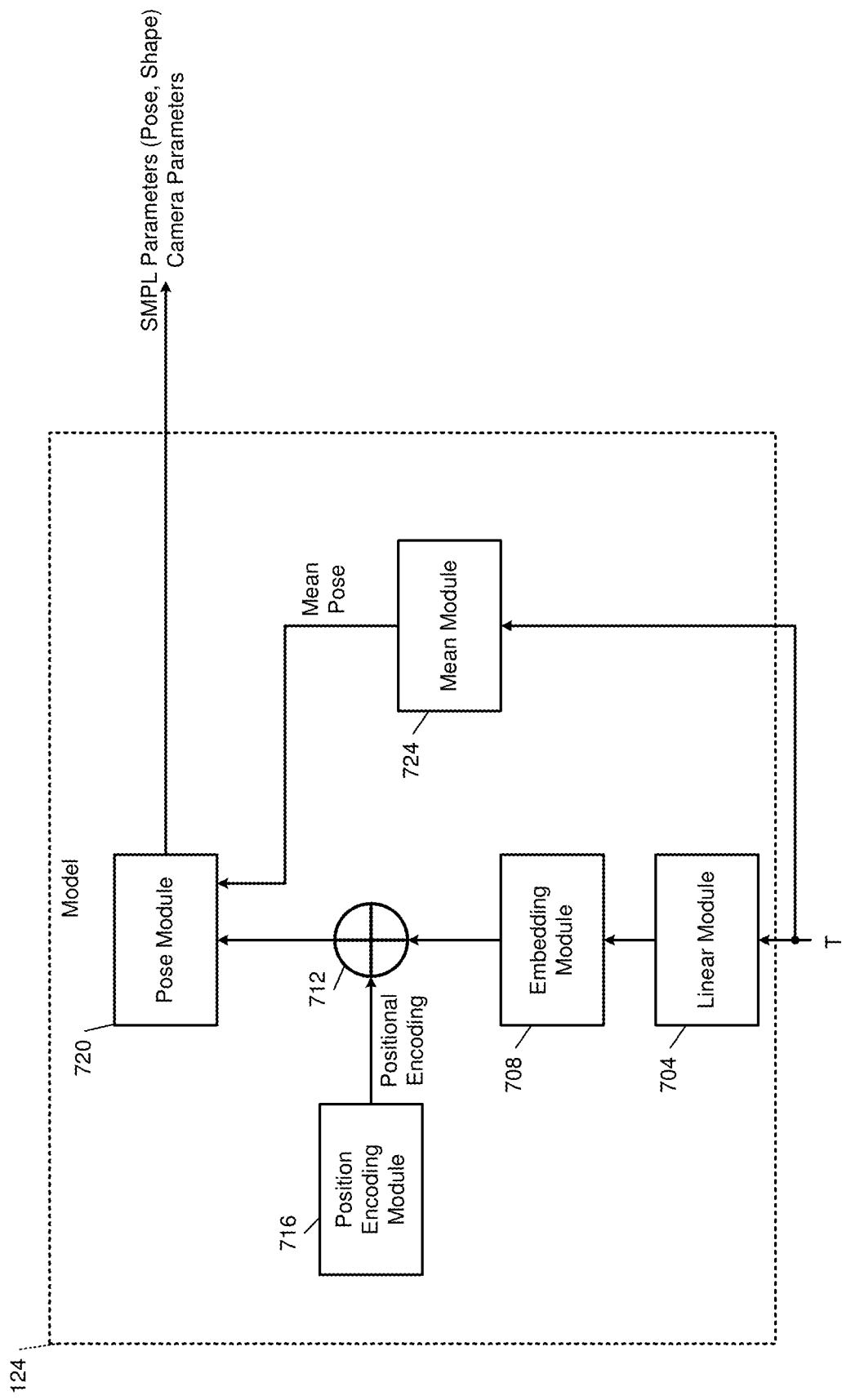
FIG. 7 includes an example pose determination system of the model that determines poses of humans in sequences of images.

FIG. 7 includes an example pose determination system of the model 124 that determines poses of humans in sequences (time series) of images (e.g., video). The model 124 may include a bidirectional encoder representations from transformers (BERT) architecture. A linear layer (module) 704 receives a time series of T vectors (for T images) corresponding to a temporal sequence of poses of length T. T is an integer greater than 1.

An embedding module 708 embeds the output of the linear layer 704 using an embedding algorithm. Embedding may also be referred to as encoding. A summation module 712 adds positional encodings from a position encoding module 716 to the output of the embedding module 708. For example, the summation module 712 may concatenate the positional encodings on to a vector output of the input embedding module 708. A pose module 720 determines poses of humans in the T images based on the output of the summation module 712 and a mean pose in the T images based on an output of a mean pose module 724 that determines the mean (average) pose.

Figure 8:
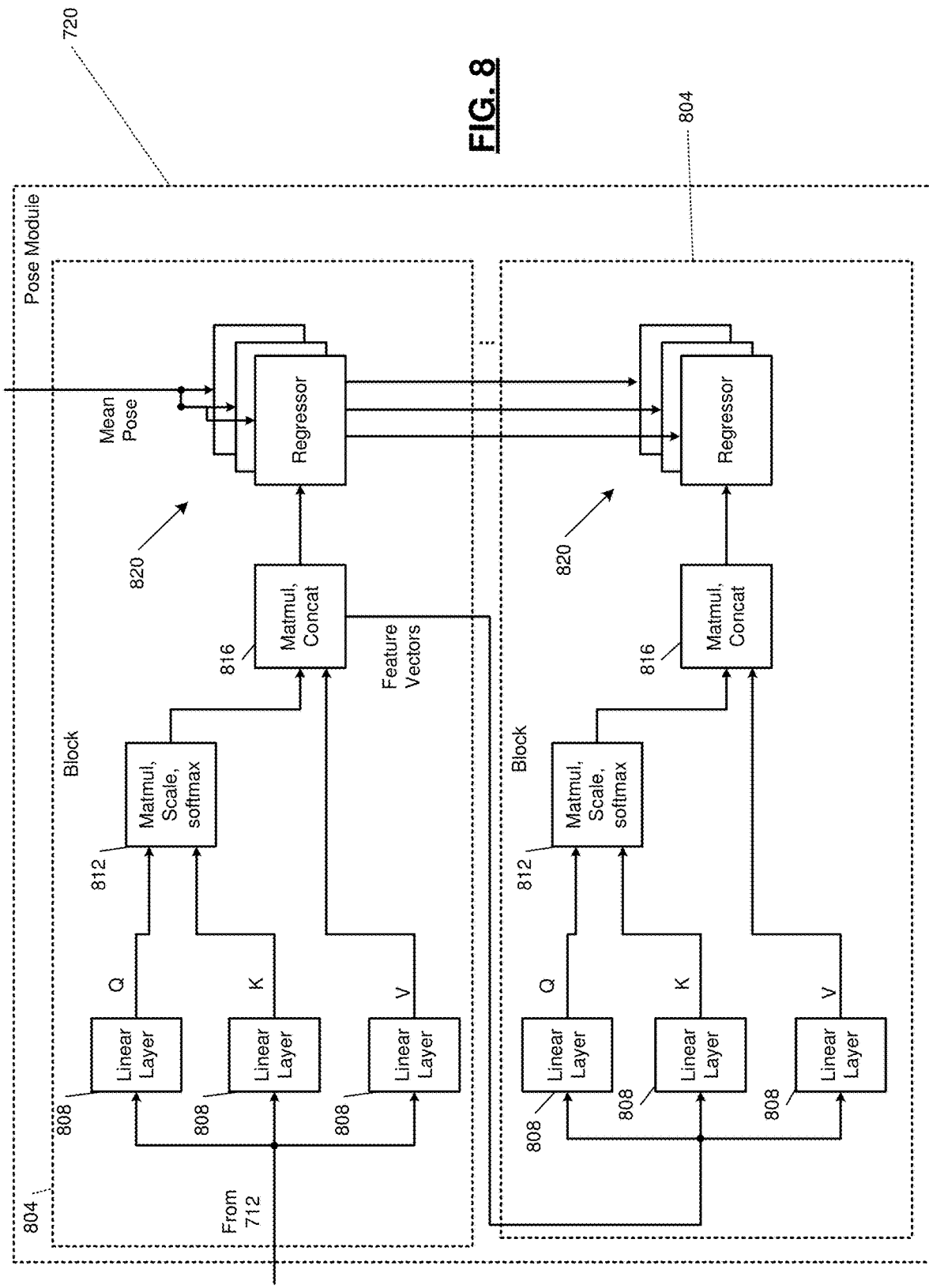
FIG. 8 is a functional block diagram of a pose module.

FIG. 8 is a functional block diagram of the pose module 720. The pose module includes L blocks (layers) 804 connected in series. L is an integer greater than or equal to 1. The first one of the blocks 804 receives the output of the summation module 712. The second block receives feature vectors output from the previous block, etc. Each block includes a multi-head scaled dot product attention mechanism that generates output for regressor modules of that block. Regressor parameters are shared across the T inputs.

Linear layers (modules) 808 of a block 804 generate key (K), query (Q), and values (V) vectors based on their inputs. Matmul, scale, and softmax modules 812 apply a matmul function on the key and query values, scale the result, and apply a softmax after the scaling. Matmul and concatenation modules 816 apply a matmul function on the output of the matmul, scale, and softmax modules 812 and concatenate the result with the values to generate feature vectors.

Regressor modules 820 attend to parts of the input sequence and directly regress the SMPL pose parameters and the camera parameters from the output of the matmul and concatenation module 816. The regressor modules 820 of the first block 804 regress the SMPL pose parameters and the camera parameters based on the mean pose. The regressor modules 820 of the other blocks 804 regress (refine) the SMPL pose parameters and the camera parameters based on the SMPL pose parameters and the camera parameters from the previous block. Each block 804 includes T regressor modules for the T images, respectively.

The pose module 720 is trained using the motion capture data 208.

Figure 9:
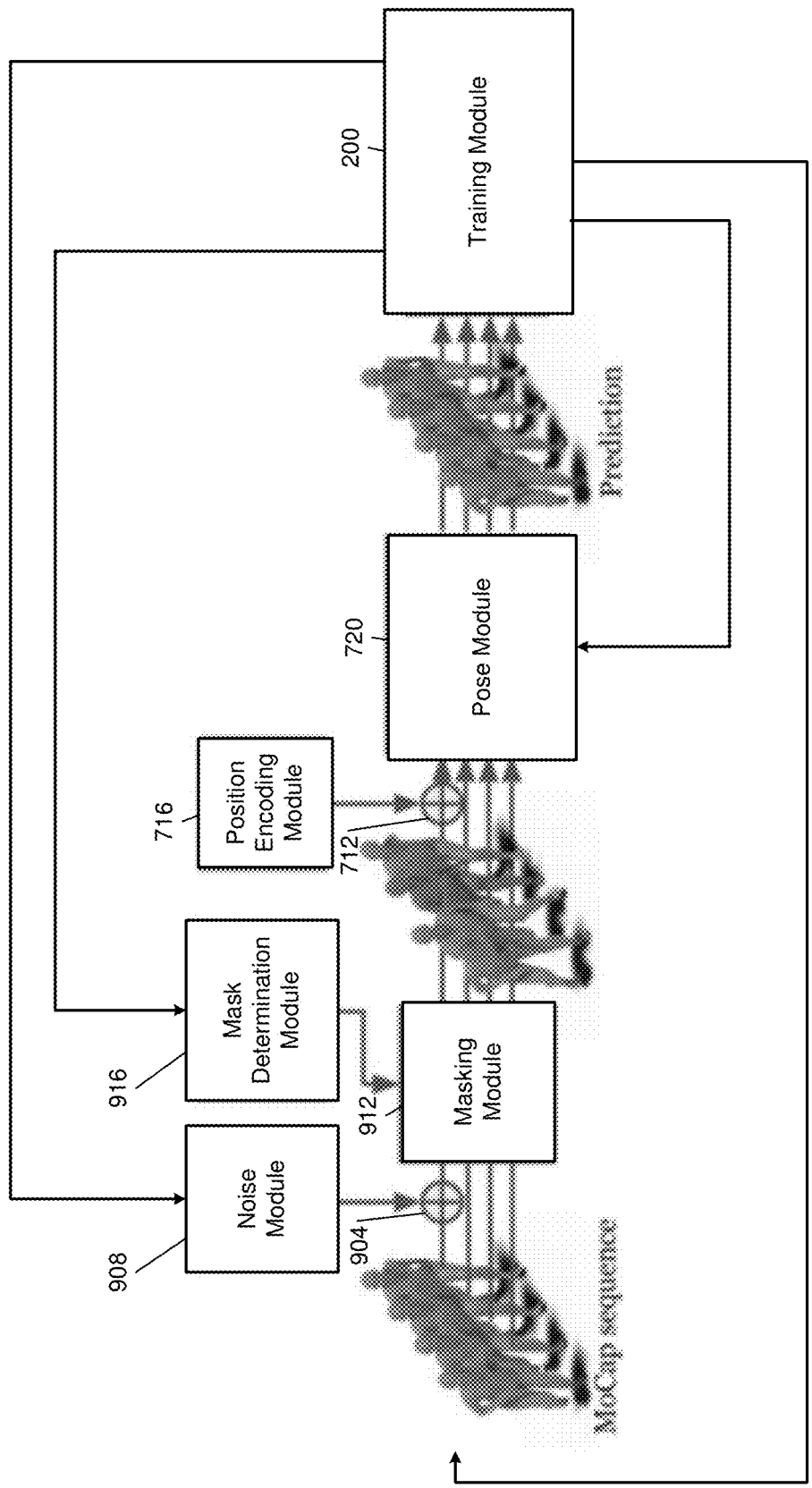
FIG. 9 is a functional block diagram of an example training system.

FIG. 9 is a functional block diagram of an example training system. The training module 200 selects sequences of T samples/images from the motion capture data 208 and inputs a sequence for training of the pose module 720. A summation module 904 may add noise from a noise module 908 to one or more of the samples. The noise may be, for example, Gaussian noise or another suitable type of noise.

A masking module 912 may mask one or more of the samples, such as by replacing a sample in the sequence with a predetermined masking token or replacing a sample in the sequence with a different sample (e.g., selected randomly from a random sample dataset). A mask determination module 916 sets which one or more of the samples to mask, such as randomly or in a predetermined order. The masking module 912 may mask a predetermined percentage of the samples, such as approximately 12.5 percent or another suitable percentage of the samples. Approximately may mean +/−10 percent.

The pose module 720 determines the pose parameters as discussed above based on the samples after the addition of noise and masking. The training module 200 trains the pose module 720, such as to minimize a SMPL pose loss and a 3D keypoint loss in the output of the pose module 720. In various implementations, one, more than one, or all of the masking module 912, the noise module 908, and the mask determination module 916 may be implemented within the training module 200.

Figure 10:
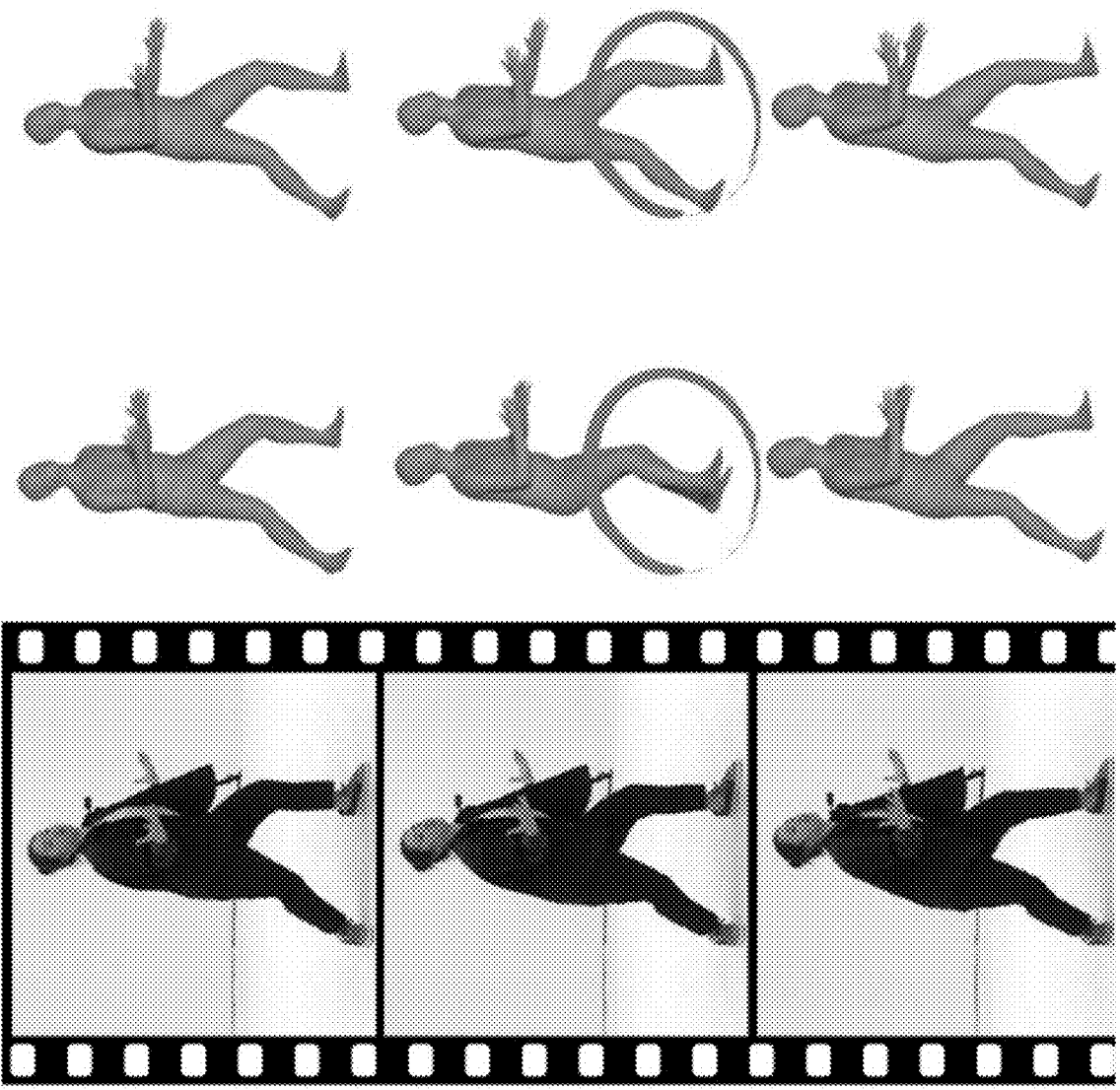
FIG. 10 includes an illustration of an example sequence of images and models generated based on poses predicted.

The training using the motion capture data enables the pose module 720 to detect and smooth inaccurate predicted poses. FIG. 10 includes an illustration of an example sequence of images in the left most column. The middle column of FIG. 10 includes models generated based on poses predicted using a standard SPIN model. As illustrated by the middle image of the middle row, the SPIN model inaccurately predicted the pose of the human.

The right most column of FIG. 10 includes models generated based on poses predicted by the pose module 720. As illustrated, the pose module 720 accurately predicts the pose illustrated by the right image of the middle row that was inaccurately predicted by the SPIN model illustrated by the middle image of the middle row.

Context provided by the temporal series enables the post module 720 to correct errors after the training as described above involving masking and introduced noise.

Table 1 below illustrates test results of the example of FIG. 4 trained as discussed above relative to the baseline SPIN model. Table 1 also illustrates that fine tune training only the batch norm layers provides an improvement relative to fine tune training all of the parameters of the example of FIG. 4. When training only the batch norm layers, all of the other parameters of are held constant. Table 1 also illustrates that the training using synthetic data (textures, backgrounds, etc.) for motion capture and real images improves accuracy. Mean per joint projection error (MPJPE), mean per vertex position error (MPVPE) and acceleration error are reported in Table 1 for different datasets reported in the columns.

TABLE 1

| | 3DPW | | | MuPoTS-3D | | AIST | | MPI-INF-3D | | MCB |
|---|---|---|---|---|---|---|---|---|---|---|
| | MPJPE↓ | ε↓ | MPVPE↓ | MPJPE↓ | ε↓ | MPJPE↓ | ε↓ | MPJPE↓ | ε↓ | MPJPE↓ |
| SPIN | 97.2 | 59.6 | 116.8 | 154.6 | 83.0 | 119.4 | 71.8 | 104.3 | 68.0 | 155.4 |
| fine-tune all parameters | 95.1 | 58.6 | 112.1 | 154.8 | 82.8 | 122.9 | 72.1 | 102.7 | 66.6 | 150.6 |
| fine-tune batch-norm layers | 94.8 | 58.1 | 111.6 | 153.7 | 82.5 | 120.2 | 71.5 | 102.4 | 67.1 | 149.7 |
| Using synthetic data | | | | | | | | | | |
| +renderings of SPIN data | 93.5 | 58.6 | 109.7 | 152.2 | 82.1 | 117.4 | 71.8 | 98.0 | 67.4 | 150.0 |
| +renderings of MoCap data (MoCap-SPIN) | 90.8 | 55.6 | 105.0 | 152.3 | 81.0 | 120.8 | 71.6 | 100.8 | 66.7 | 145.0 |

Figure 11:
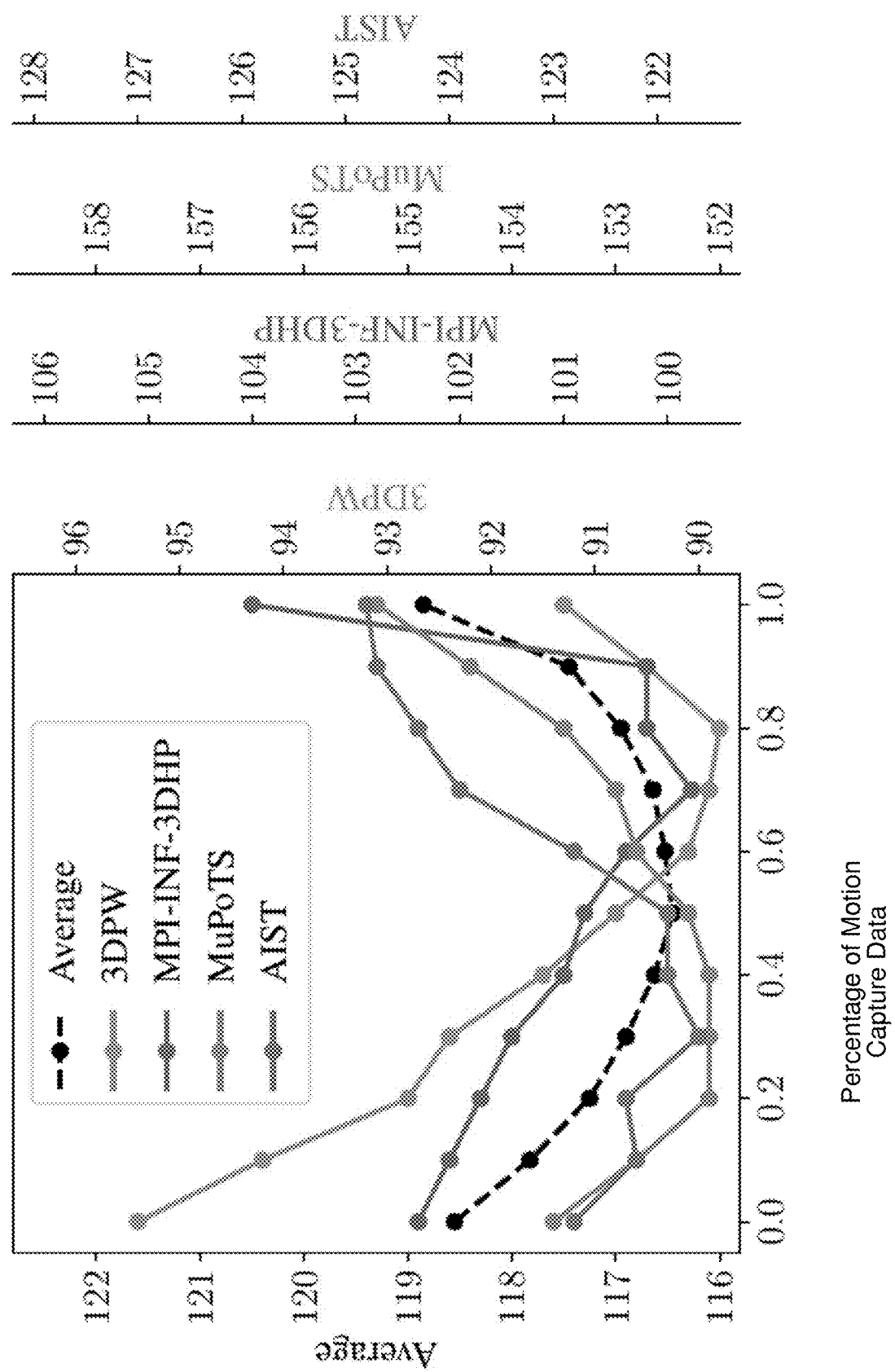
FIG. 11 includes an example graph of percentage of motion capture data used in each batch during training versus error for different datasets.

The percentage of synthetic renderings in each batch of training data used may impact accuracy of the trained model. FIG. 11 includes an example graph of percentage of motion capture data used in each batch during training versus MPJPE for different datasets. The average (Average) is also plotted. As illustrated, a U-shaped curve appears on all datasets as the percentage of synthetic data increases meaning that an optimal value is not an extreme value (i.e., neither only real data nor only synthetic data). 50 percent synthetic data may be provide a good compromise.

Regarding the example of FIG. 7, PA-MPJPE on three datasets is reported in Table 2 below. 12.5% of the input poses were masked. Table 3 illustrates that the example of FIG. 7 consistently provides a gain of 1 to 3 millimeters (mm) on all datasets. Removing the positional encoding may lead to decreased performance, indicating that incorporating temporal information within the model is key to improved accuracy. Sharing the regressor allows for a reduction in the number of learnable parameters and provides better predictions. Iteration over the regressor only a single time after each layer may be performed given that more iterations may not provide an improvement and may even decrease performance.

As illustrated by Table 2, the number of blocks (L) of the example of FIG. 7 may be 4 to perform suitably, and an embedding dimension of Dt=512 may be used. Increasing the model complexity may provide only minimal improvements. For temporal length of training sequences, T may be equal to 16 as longer sequence may not provide further improvements.

TABLE 2

|  | 3DPW | MPI-INF-3DHP | MuPoTS-3D |
|---|---|---|---|
| MoCap-SPIN | 55.6 | 66.7 | 81.0 |
| MoCap-SPIN + PoseBERT | 53.2 | 63.8 | 80.3 |
| w/o pos. encoding | 54.8 | 64.0 | 80.8 |
| w/o shared regressor | 54.0 | 65.0 | 81.0 |
| with 2 regressor iterations | 53.3 | 64.0 | 80.5 |
| with 4 regressor iterations | 53.4 | 64.2 | 80.5 |
| L = 1 | 54.5 | 67.0 | 81.2 |
| L = 2 | 53.9 | 65.5 | 81.0 |
| L = 4 (default) | 53.2 | 63.8 | 80.3 |
| L = 8 | 53.4 | 63.3 | 80.2 |
| $D_t$ = 128 | 55.6 | 69.4 | 82.0 |
| $D_t$ = 256 | 53.7 | 64.0 | 80.4 |
| $D_t$ = 512 (default) | 53.2 | 63.8 | 80.3 |
| $D_t$ = 1024 | 53.4 | 62.9 | 80.3 |
| T = 8 | 53.9 | 65.2 | 80.2 |
| T = 16 (default) | 53.2 | 63.8 | 80.3 |
| T = 32 | 53.4 | 63.6 | 8.3 |
| T = 64 | 53.3 | 63.7 | 80.4 |

Masking 12.5% of the samples (e.g., 2 frames out of 16) provides a smoother prediction with lower acceleration while PA-MPJPE remains low. The addition of noise also provides an increase in performance and smoother predictions. Table 3 below illustrates test results for different levels of masking with and without noise.

TABLE 3

|  | 3DPW | | MPI-INF-3DHP | | MuPoTS-3D | |
|---|---|---|---|---|---|---|
| Masking % | ε↓ | Accel↓ | ε↓ | Accel↓ | ε↓ | Accel↓ |
| MoCap-SPIN | 55.6 | 32.5 | 66.7 | 29.5 | 81.0 | 23.5 |
| 0% | 53.3 | 9.6 | 62.3 | 9.8 | 8.0 | 13.8 |
| 12.5% | 53.2 | 7.8 | 63.8 | 8.7 | 80.3 | 12.8 |
| 25% | 53.3 | 8.3 | 64.2 | 9.0 | 80.3 | 13.3 |
| 37.5% | 53.9 | 9.0 | 65.0 | 9.2 | 80.8 | 14.0 |
| 12.5% + Noise | 52.9 | 7.8 | 63.3 | 8.7 | 80.2 | 12.9 |

The example of FIG. 7 may be used on top of any image based model to transform it into a video based posed estimation model. Table 4 below illustrates test results on different datasets when the example of FIG. 7 is used with an image based model (including the example of FIG. 4).

TABLE 4

|  | 3DPW | MPI-INF-3DHP | MyPoTS-3D | AIST |
|---|---|---|---|---|
| SPIN + | 59.6 | 68.0 | 83.0 | 71.8 |
| PoseBERT | 58.2 (↓1.4) | 64.3 (↓3.7) | 81.7 (↓1.3) | 70.2 (↓1.6) |
| VIBE + | 56.5 | 65.4 | 83.4 | 71.8 |
| PoseBERT | 54.9 (↓1.6) | 64.4 (↓1.0) | 82.6 (↓0.8) | 70.3 (↓1.5) |
| MoCAP-SPIN + | 55.6 | 66.7 | 81.0 | 71.6 |
| PoseBERT | 53.2 (↓2.4) | 63.8 (↓2.9) | 80.3 (↓0.7) | 69.7 (↓1.9) |

Table 4 above illustrates that the example of FIG. 7 provides improvements relative to the image based model on different datasets.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A training system comprising:
    a neural network model configured to determine three-dimensional coordinates of joints, respectively, representing poses of animals in images,
    wherein the neural network model is trained using a first training dataset including:
       images including animals; and
       coordinates of joints of the animals in the images, respectively; and
    a training module configured to, after the training of the neural network model using the first training dataset, train the neural network model using a second training dataset including motion capture data,
    wherein the motion capture data does not include images of animals and includes measured coordinates at points, respectively, on animals,
    wherein the neural network model includes batch normalization layers, and
    wherein the training module is configured to, after the training of the neural network model using the first training dataset, train the neural network model by adjusting only parameters of the batch normalization layers and maintaining all other parameters of all other portions of the neural network model constant after the training of the neural network model using the first training dataset,
    wherein the training module is configured to, after the training of the neural network model using the first dataset, train the neural network model using texturized body models of animals with backgrounds applied.

2. The training system of claim 1 wherein the training module is configured to, after the training of the neural network model using the first training dataset, train the neural network model further using data from the first training dataset.

3. The training system of claim 2 wherein the training module is configured to generate the texturized body models of animals with backgrounds applied by:
    rendering body models of animals based on the motion capture data;

texturizing the body models using textures from a texture dataset; and apply backgrounds to the body models from a background dataset.

4. The training system of claim 3 wherein the training module is further configured to selectively:
render second models of the animals in the images using the coordinates of the joints of the animals, respectively;
texturize the second models using textures from the texture dataset;
apply second backgrounds to the models from the background dataset; and
train the neural network model using the texturized second models with the second backgrounds.

5. The training system of claim 1 wherein the model is the SPIN model.

6. The training system of claim 1 wherein the motion capture data in the second training dataset includes motion capture data from the AMASS dataset.

7. A system, comprising:
a neural network model configured to determine three-dimensional coordinates of joints, respectively, representing a pose of an animal in an image,
wherein the neural network model is trained using:
a first training dataset including:
images including animals; and
coordinates of joints of the animals in the images, respectively; and
a second training dataset including motion capture data that:
does not include images of animals; and
includes measured coordinates at points, respectively, on animals;
wherein the neural network model includes batch normalization layers, and
wherein the neural network model is trained by adjusting only parameters of the batch normalization layers and maintaining all other parameters of all other portions of the neural network model constant after the training of the neural network model using the first training dataset; and
a camera configured to capture images; and
a control module configured to selectively actuate an actuator based on three-dimensional coordinates of joints representing a pose of an animal determined by the neural network model based on an image captured by the camera,
wherein the neural network model is further trained based on texturized body models of animals with generated backgrounds.

8. A training system, comprising:
a neural network model configured to determine three-dimensional coordinates of joints, respectively, representing poses of animals in sequences of images;
a training module configured to train the neural network model using a training dataset including sets of time series of motion capture data,
wherein the motion capture data does not include images of animals and includes measured coordinates at points, respectively, on animals,
wherein the training module is configured to render a time series of body models of animals based on one of the sets of time series of motion capture data; and
a masking module configured to replace a first predetermined percentage of the body models in the time series of body models with different body models of animals,
wherein the training module is configured to train the neural network model based on outputs of the neural network model generated in response to the time series of body models.

9. The training system of claim 8 wherein the training module is configured to:
texturize the body models using textures from a texture dataset;
apply backgrounds to the body models from a background dataset; and
train the neural network model using the texturized body models with the backgrounds.

10. The training system of claim 9 wherein the masking module is further configured to replace at least one of the body models in the time series of models with a predetermined masking token.

11. The training system of claim 10 wherein the masking module is configured to replace a second predetermined percentage of the body models in the time series of body models with a predetermined masking token.

12. The training system of claim 11 wherein the second predetermined percentage is approximately 12.5 percent.

13. The training system of claim 9 further comprising a noise module configured to add noise to at least one of the body models in the time series of body models.

14. The training system of claim 13 wherein the noise includes Gaussian noise.

15. The training system of claim 9 further comprising a position encoding module configured to add positional encodings to the time series of body models.

16. The training system of claim 9 wherein the training module is configured to train the neural network model based on minimizing a pose loss determined based on differences between:
three-dimensional coordinates determined by the neural network model based on the time series of body models of animals; and
coordinates of the motion capture data stored in the training dataset.

17. The training system of claim 9 wherein the training module is configured to train the neural network model based on minimizing a three-dimensional keypoint loss determined based on differences between:
three-dimensional coordinates determined by the neural network model based on the time series of body models of animals; and
coordinates of the motion capture data stored in the training dataset.

18. A system, comprising:
a neural network model configured to determine three-dimensional coordinates of joints, respectively, representing poses of animals,
wherein the neural network model is trained using a training dataset including motion capture data that:
does not include images of animals; and
includes measured coordinates at points, respectively, on animals; and
wherein the neural network model includes batch normalization layers, and
wherein the neural network model is trained by adjusting only parameters of the batch normalization layers and maintaining all other parameters of all other portions of the neural network model constant after the training of the neural network model using the training dataset;
a camera configured to capture time series of images; and
a control module configured to selectively actuate an actuator based on three-dimensional coordinates of joints representing a pose of an animal determined by the neural network model based on a time series of images captured by the camera, wherein the neural network model is further trained based on texturized body models of animals with generated backgrounds.

19. A training method comprising:

training, using a first training dataset, a neural network model to determine three-dimensional coordinates of joints, respectively, representing poses of animals in images, the first training dataset including:
  images including animals; and
  coordinates of joints of the animals in the images, respectively; and after the training of the neural network model using the first training dataset, training the neural network model using a second training dataset including sets of time series of motion capture data, wherein the motion capture data does not include images of animals and includes measured coordinates at points, respectively, on animals, wherein the training the neural network using the second training dataset includes:
  rendering a time series of body models of animals based on one of the sets of time series of motion capture data; replacing a first predetermined percentage of the body models in the time series of models with different body models of animals; and training the neural network model based on outputs of the neural network model generated in response to the time series of body models.

20. A method, comprising:

using a neural network model, determining three-dimensional coordinates of joints, respectively, representing a pose of an animal in an image, wherein the neural network model is trained using:
  a first training dataset including:
    images including animals; and
    coordinates of joints of the animals in the images, respectively; and
  a second training dataset including motion capture data that:
    does not include images of animals; and
    includes measured coordinates at points, respectively, on animals, wherein the neural network model includes batch normalization layers, and the neural network model is trained by adjusting only parameters of the batch normalization layers and maintaining all other parameters of all other portions of the neural network model constant after the training of the neural network model using the first training dataset; and capturing images using a camera; and selectively actuating an actuator based on three-dimensional coordinates of joints representing a pose of an animal determined by the neural network model based on an image captured by the camera, wherein the neural network model is further trained based on texturized body models of animals with generated backgrounds.

* * * * *